US008588302B2

(12) United States Patent
Einarsson

(10) Patent No.: US 8,588,302 B2
(45) Date of Patent: Nov. 19, 2013

(54) PACKET LOSS ANALYSIS

(75) Inventor: Torbjörn Einarsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 336 days.

(21) Appl. No.: 12/997,750

(22) PCT Filed: Jun. 13, 2008

(86) PCT No.: PCT/EP2008/057446
§ 371 (c)(1),
(2), (4) Date: Dec. 13, 2010

(87) PCT Pub. No.: WO2009/149762
PCT Pub. Date: Dec. 17, 2009

(65) Prior Publication Data
US 2011/0096836 A1 Apr. 28, 2011

(51) Int. Cl.
*H04N 7/50* (2006.01)
(52) U.S. Cl.
USPC .............................. 375/240.13; 375/E07.271
(58) Field of Classification Search
None
See application file for complete search history.

(56) References Cited

U.S. PATENT DOCUMENTS

| 6,891,565 B1 | 5/2005 | Dieterich |
| 2002/0046308 A1 | 4/2002 | Devlin et al. |
| 2002/0100054 A1 | 7/2002 | Feinberg et al. |
| 2006/0253599 A1* | 11/2006 | Monteiro et al. ............. 709/230 |
| 2006/0285757 A1* | 12/2006 | Abe et al. ...................... 382/236 |
| 2007/0031126 A1* | 2/2007 | Jung et al. ..................... 386/124 |
| 2007/0105631 A1* | 5/2007 | Herr et al. ....................... 463/42 |
| 2008/0037864 A1 | 2/2008 | Zhang et al. |
| 2009/0028232 A1 | 1/2009 | Baumgartner et al. |
| 2010/0177196 A1 | 7/2010 | Beerends et al. |

FOREIGN PATENT DOCUMENTS

| WO | WO 2007/053538 | 5/2007 |
| WO | WO 2007/110233 | 10/2007 |

OTHER PUBLICATIONS

International Search Report for PCT/EP2008/057446, mailed Apr. 6, 2009.
International Preliminary Report on Patentability for PCT/EP2008/057446, dated Jan. 27, 2010, with Six (6) Amended Sheets.
Yuan, L. et al., "On the Error Resilience of Rate Smoothing Using Explicit Slice-Based Mode Selection", Multimedia and Expo, (Jul. 1, 2007), pp. 2134-2137.

* cited by examiner

*Primary Examiner* — Sath V Perungavoor
*Assistant Examiner* — Kate Luo
(74) *Attorney, Agent, or Firm* — Nixon & Vanderhye P.C.

(57) ABSTRACT

A test sequence (1) comprises multiple pictures (20, 22, 24, 26) comprising at least one respective intra pixel block (30, 32, 34, 36) at a respective dedicated pixel position in the pictures (20, 22, 24, 26). Such a position in a first picture (20) is different from the position of the intra block (32) in a second picture (22) of the sequence. The sequence (1) is transmitted to a user terminal (200) where it is employed for testing the quality of the data communication. By rendering the pictures (20, 22, 24, 26) packet losses are identifiable as missing pixel blocks (30, 332, 34, 36) in the media presentation (60).

15 Claims, 8 Drawing Sheets

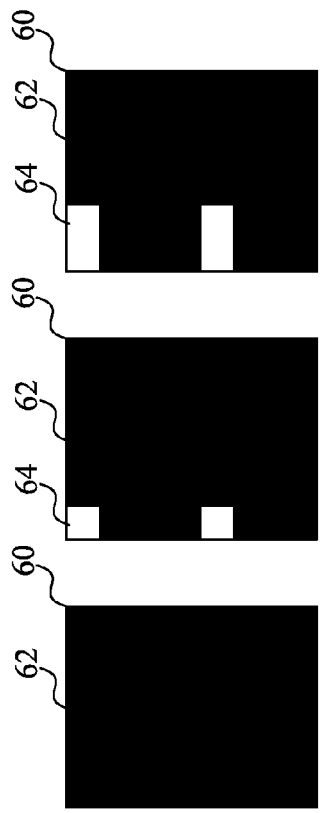
Fig. 7
Fig. 8
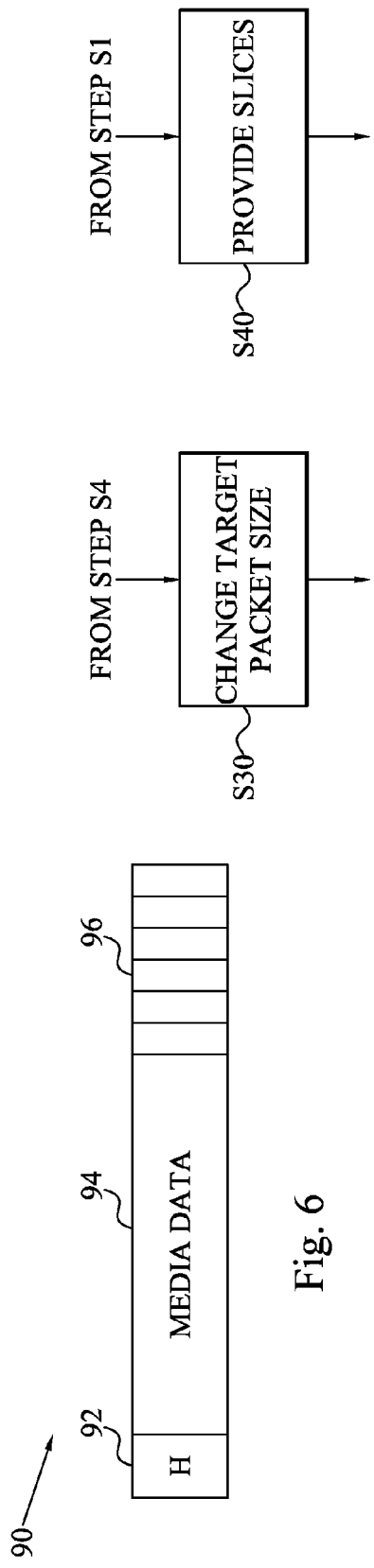
Fig. 6
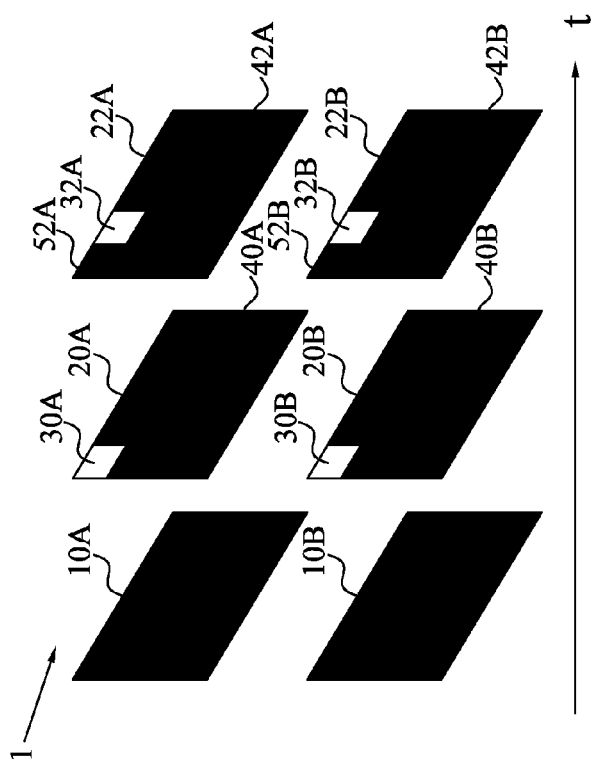
Fig. 9
Fig. 10A  Fig. 10B  Fig. 10C

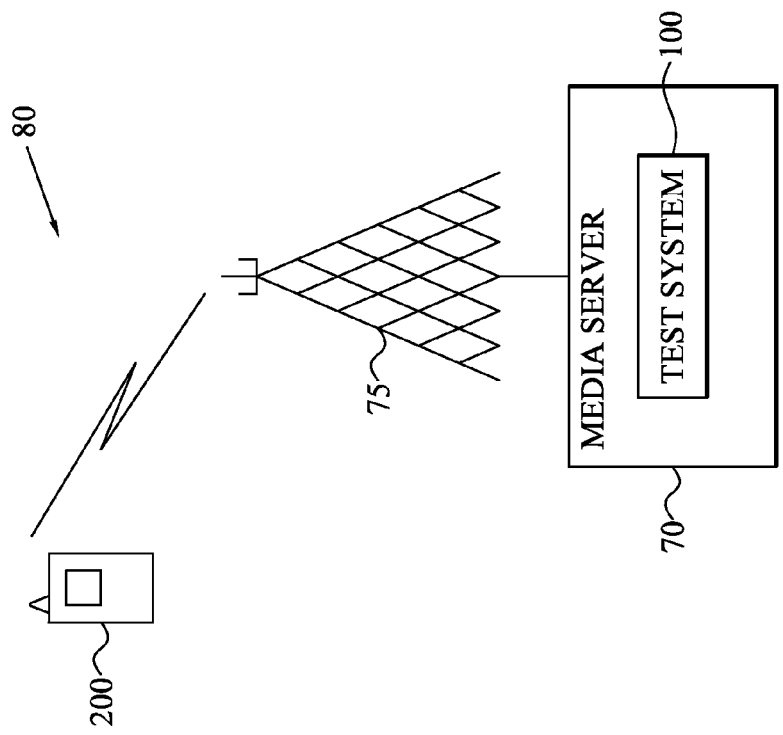
Fig. 15
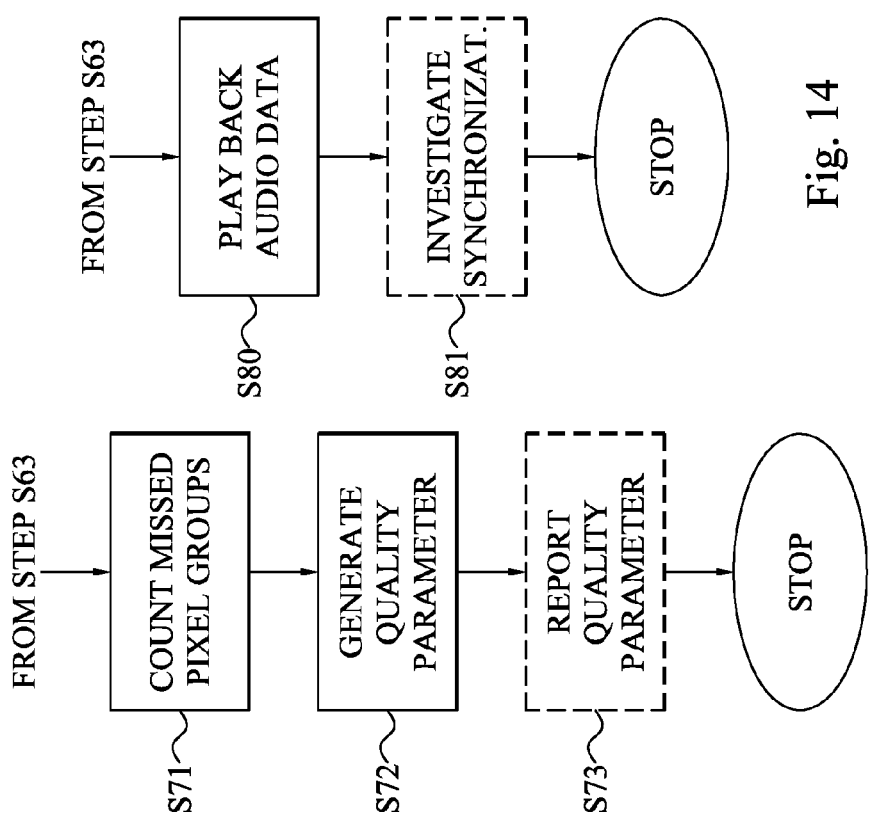
Fig. 14
Fig. 13

PACKET LOSS ANALYSIS

This application is the U.S. national phase of International Application No. PCT/EP2008/057446 filed 13 Jun. 2008, the entire contents of which is hereby incorporated by reference.

TECHNICAL FIELD

The present invention generally relates to packet loss analysis in data communications systems, and in particular to generation and usage of a test sequence employed for analyzing packet losses.

BACKGROUND

It is quite popular to use streaming technologies to watch video or listen to music in data communications systems. This is in particular so in wireless and mobile systems. A streaming session typically involves a client which connects to a server and chooses and controls the media via a control protocol such as RTSP (Real-Time Streaming Protocol) while the media is sent from the server to the client using RTP (Real-time Transport Protocol) over UDP (User Datagram Protocol) over IP (Internet Protocol).

However, there is a risk that the bandwidth needed for the transport of the media is not sufficient, resulting in packets being lost in the transport. This will appear as deterioration in the video quality and/or artefacts in the sound. Since such packet losses will be perceived as very bad by the users, it is important to be able to test mobile (wireless) links and also other links and measure how the network behaves for streams with various bitrates.

Today, such a test is typically done by a special test setup procedure where a dedicated testing client, such as a TEMS™ capable terminal, connects to a server and there is some monitoring of packet losses in the network or in the terminal. The monitoring is done by sniffing the network traffic, or by looking at reports sent back to the server.

However, these dedicated devices, such as TEMS™ devices, are complicated and may only be operated by trained experts. Only these experts are capable of determining the quality of the data connection by using the dedicated devices.

WO 2007/110233 discloses a digital test sequence that can be used for evaluating data communication and analyzing packet losses. The test sequence comprises an initial intra-coded picture followed by a plurality of predicted pictures. These following pictures are free from any intra-coded information. In clear contrast, the chrominance is varying between two different values for consecutive pictures in the sequence, while the luminance component is kept zero. By using the repair strategies of the decoder, packet losses can be identified in the displayed media presentation.

SUMMARY

WO 2007/110233 uses a switch between two chrominance values between consecutive predicted pictures. Due to this chrominance switching, packet losses may become unnoticed if they are covered by later packet losses corresponding to the same picture portions but present in different pictures of the sequence.

The present invention overcomes these and other drawbacks of the prior art arrangements.

It is a general object of the present invention to provide a test sequence that can be used for detecting packet losses and monitoring the quality of a data connection.

This and other objects are met by the invention as defined by the accompanying patent claims.

Briefly, the present invention involves generation of a digital media test sequence. The sequence comprises multiple pictures each having at least one respective intra coded pixel group at a respective dedicated pixel position in the different pictures. Furthermore, the pixel position of the intra group in a first picture is different from the corresponding pixel position of the intra group in a second picture of the sequence. The picture data is then packed into data packets, with preferably the data corresponding to one picture per data packet or multiple packets together carry the data of one picture.

The generated test sequence is transmitted to a requesting terminal that wants to evaluate a communication link and analyze packet losses in a test session. The data packets of the test sequence are received at the terminal, where the data therein is unpacked, decoded and processed in order to provide picture data that can be co-processed to form a media presentation. This media presentation changes as more and more pictures become rendered. Upon each rendered picture at least one intra pixel block becomes visible in the media presentation at the dedicated position(s) assigned to that picture. If there are any packet losses, they are easily identified as missed pixel groups in the media presentations.

The present invention can be used in connection with inter-predicted pictures, where each such inter picture has at least one intra-coded pixel block at a pixel position dedicated for that inter picture. During rendering, this means that those pixels occupying the pixel positions that are assigned to the intra groups in lost inter pictures will have a different color or at least different luminance in the media presentation than the pixels occupying pixel positions that are assigned to intra groups in correctly received and rendered inter pictures of the sequence.

In an alternative implementation, the pictures of the test sequence are intra-coded pictures each having at least one intra-coded pixel block of a color or luminance different from the remaining pixels in the intra picture. The position of this special intra block is furthermore specific for the given intra picture. During rendering this results in the visual effect of a "moving" pixel block moving between different positions on the display screen. A lost data packet is noticed as a jump in the block moving path.

The present invention also relates to the digital media test sequence, a system for generating such a test sequence and a device that uses the sequence for analyzing the quality of a communication link.

SHORT DESCRIPTION OF THE DRAWINGS

The invention together with further objects and advantages thereof, may best be understood by making reference to the following description taken together with the accompanying drawings, in which:

FIG. 3 is a schematic overview of a test sequence generated according to an embodiment of the present invention;

FIGS. 4A to 4H are media presentations obtained from processing of a test sequence according to an embodiment of the present invention;

FIG. 7 is a flow diagram illustrating an additional step of the sequence generating method;

FIG. 8 is a flow diagram illustrating an additional step of the sequence generating method;

FIG. 9 is a schematic overview of a test sequence generated according to another embodiment of the present invention;

FIGS. 10A to 10C are media presentations obtained from processing of a test sequence according to another embodiment of the present invention;

FIG. 13 is a flow diagram illustrating an additional step of the connection testing method;

FIG. 14 is a flow diagram illustrating an additional step of the connection testing method;

FIG. 15 is a schematic overview of a portion of a data communication system to which the present invention can be applied;

DETAILED DESCRIPTION

Figure 1:
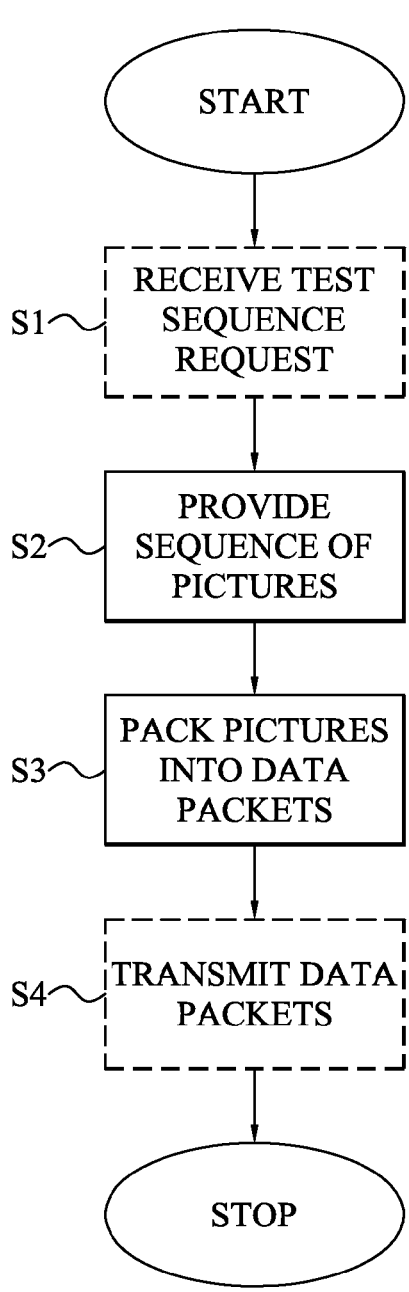
FIG. 1 is a flow diagram of a method of generating a test sequence according to an embodiment of the present invention.

Throughout the drawings, the same reference characters will be used for corresponding or similar elements.

The present invention is directed towards conditioning of a data communication or link employable for communicating data packets from a transmitter to a receiver. This communication evaluation in particular allows analyzing the number of packet losses occurring during the data communication. The invention is directed towards providing such analyzing functionality in traditional communication units, without the need of having dedicated, expensive test equipments. This opens up for the regular user to use the invention for the purpose of analyzing the current traffic situation, for instance in connection with establishing a communication session.

The present invention can be used for analyzing any communication link between two communicating entities. This means that the invention can be employed in connection with both wired and wireless links. However, as is well known in the art, in particular wireless links experiences varying link qualities, for instance, due to interference and fading. As a consequence, the present invention is in particular suitable for usage in analyzing such wireless communication links.

The invention is advantageously used for analyzing the link quality in connection with a media or multimedia session. Such sessions are sensitive to changes in the bandwidth resulting in packet losses. These losses result in a significant deterioration of the experienced quality when rendering the media for the user. This means that the invention can advantageously be used in connection with a media or multimedia session. Such a session may involve a transmitting node multicasting or broadcasting media data to one or more listening clients, such as for IPTV (Internet Protocol Television). Also unicast-based sessions can benefit from the invention, such as media streaming sessions. Though the invention can be used in connection with establishing a media session, the present invention is not limited thereto. In clear contrast, the digital test sequence of the invention can indeed be used any time for testing the current link quality and packet losses for a communication link between a transmitting entity and a receiving entity in a communication network, preferably a mobile, wireless network.

FIG. 1 is a flow diagram illustrating a method of generating a digital media test sequence that can be used according to the present invention for analyzing data communication and determining packet losses. The method starts in the optional step S1, where a request for a test sequence is received. Such a request is typically generated by a user client or terminal and transmitted to the sequence generating server, either directly or using one or more intermediate nodes in the communication network. The sequence request is processed in order to identify the relevant terminal to which the test sequence should be transmitted. As is discussed further herein, the request processing may also involve other operations, such as adjusting bit rate, etc.

The request can, in particular if the request is made in connection with a media session, such as a streaming session, be in the form of a URI (Uniform Resource Identifier), such as rtsp://constant.video.com. The provision of a test sequence of the invention in response to such a request can either be performed by creating the test sequence content on the fly or select the test sequence content from one or more pre-encoded test sequences. The following steps S2 and S3 discusse the generation of the test sequence, which thus can be performed on the fly or in advance to any sequence request.

In a next step S2, a sequence of multiple pictures or frames is provided. According to the present invention, each picture of the sequence comprises at least one group of intra-coded pixels. Thus, even though the picture as a whole may be inter-predicted as is further described herein, it comprises at least one intra-coded pixel group while remaining pixel groups are then inter predictive coded in the case of inter pictures.

The pixel group can be any grouping of one, but typically multiple, i.e. at least two, pixels that are handled together during the pixel coding and decoding. Such a pixel group can have different sizes, such as M×N pixels and preferably M×M pixels. Examples of such pixel groups include so called macroblocks generally having a size of 16×16 pixels. Other examples of pixel groups include different partitions of macroblocks, such as 8×8, 8×4, 4×8 and 4×4 blocks. Actually, the present invention can be used in connection with any pixel block or group size that can be signaled to be encoded in intra mode.

The intra-coded pixel group in the picture is provided at a dedicated pixel position of the picture. This dedicated position if furthermore specific for the particular picture. As a consequence, different pictures have their respective intra-coded pixel group(s) at different pixel positions, preferably different non-overlapping and unique pixel positions. In other words, the dedicated pixel position(s) of the intra-coded pixel group(s) in a first picture of the sequence is different from the dedicated pixel position(s) of the intra-coded pixel group(s) present in a second picture. For instance, a first picture can have a intra-coded macroblock occupying the pixel position: $P_{1,1}$-$P_{1,16}$, $P_{2,1}$-$P_{2,16}$, ..., $P_{16,1}$-$P_{16,16}$. A next picture could then instead have its intra-coded macroblock at the corresponding pixel position: $P_{1,17}$-$P_{1,32}$, $P_{2,17}$-$P_{2,32}$, ..., $P_{16,17}$-

$P_{16,32}$ and so on, where $P_{i,j}$ represents the pixel position of row i and column j. There is therefore preferably a one-to-one relationship between the picture and the relative position of the intra-coded pixel group for the pictures provided in step S2.

The intra-coded groups preferably have a predefined color pattern. A preferred example of such a predefined pattern is to have uniformly colored intra-coded groups where all pixels of the pixel groups have a same color. In such a case, all intra-coded groups of the pictures in the sequence could have one and the same color or different groups can have different colors.

According to the H.263 baseline and Annex I standard, H.264 standard and MPEG-4 Part 2 video standard such an intra macroblock can be coded by setting all its AC coefficients to zero and set the DC coefficients of the macroblock to the desired color. For H.264, the Independent intra flag is preferably turned on to avoid error propagation in the intra block in the case of packet losses.

In an embodiment of the invention, the multiple pictures provided in step S2 are inter-predicted pictures comprising one or a limited number of intra-coded pixel groups. These inter-predicted pictures are typically called P-pictures or frames (Predicted pictures) or B-pictures or frames (Bi-directional predictive pictures).

In such a case, any pixel groups at previous pixel positions in the inter-predicted pictures are inter-coded and preferably coded according the so-called skip mode [1]. Briefly, the skip-mode implies that the macroblock area is unchanged so that no data need to be transferred. As a consequence, the pixel area represented by a skipped macroblock uses the corresponding pixel area in the reference picture preferably without any modifications. An alternative approach to using skip-mode pixel groups is to instead assign a zero motion vector to the inter-predicted pixel group and also assign a zero prediction error. The result will be the same as for the skip-mode but requires encoding and transmitting more data than using a skip-block signaling.

The previous pixel groups are any groups present in the inter-predicted picture at previous pixel positions relative the intra-coded pixel group when traveling in traversal order, i.e. starting from the first pixel position $P_{1,1}$ and traveling row by row to the last pixel position $P_{m,n}$ in the picture. Depending on the particular inter-predicted picture and therefore the specific position(s) of its intra-coded pixel group(s), no, one or multiple previous inter-coded (skipped) pixel groups can be present in the picture.

In a preferred embodiment, not only the previous pixel group(s) (if any) in the picture relative the intra pixel group is inter-coded and preferably as a skipped pixel group. Thus, all remaining pixel groups, i.e. all such groups in the inter-predicted pictures besides the intra-coded pixel groups, are preferably inter-coded pixel groups and more preferably coded according the skip mode (or alternatively coded with zero motion vector and zero prediction error). In such a case, only the respective intra pixel groups of the inter pictures in the sequence will provide any visual media data during rendering of the test sequence.

In an alternative embodiment the multiple provided pictures are intra-predicted pictures, so called I pictures or frames in the art. As discussed in the foregoing, each such intra picture comprises a specific intra pixel group at a specific position dedicated for that intra picture. In such a case, the colors of the pixels at the specific intra pixel group(s) of the intra picture is different from or at least have different luminance as compared to the other pixels in the intra picture. As a consequence, the particular intra pixel group is clearly visible in the intra picture during rendering.

A next step S3 packs the provided sequence of provided pictures into multiple data packets to form the digital media test sequence of the invention. This packing step S3 preferably involves providing one picture per data packet, or as is discussed further herein, at least two data packets can be used for together carrying the data of one picture.

The next optional step S4 transmits the data packets of the test sequence to the requesting user terminal. This data transmission can be in the form of broadcast, multicast or unicast transmission as mentioned above, in particular through streaming of the data packets from the server to the terminal. The method then ends.

In a traditional media or video sequence, the user terminal typically starts rendering the media content upon reception of an intra-predicted picture or frame (I-picture). However, some user terminals can start rendering media without receiving any intra picture. These terminals typically use a pre-defined background picture, typically a one-colored picture as starting picture. A next inter-predicted picture is decoded based on this starting picture as reference picture. As a consequence, the digital media test sequence of the present invention can be used without any intra-coded pictures and then only comprise the above-described sequence of multiple inter-predicted pictures.

However, other terminals are configured for waiting with the decoding and media rendering until a first intra-predicted picture is received. A preferred embodiment of the digital test sequence comprising inter pictures applicable in such terminals therefore comprises an initial intra picture. As is discussed further herein, this embodiment of the test sequence may also comprise periodic intra pictures to handle the case where the initial intra picture is fully or partially lost.

Figure 2:
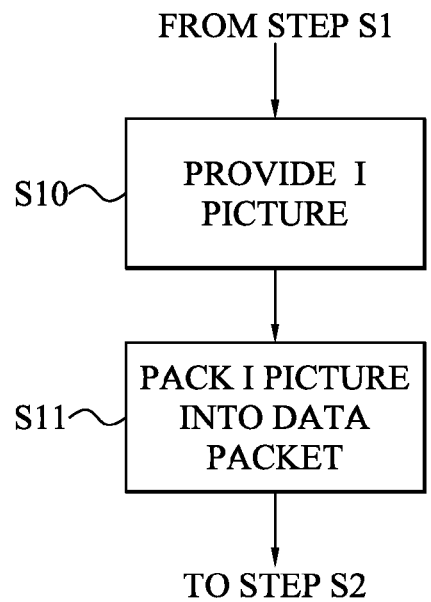
FIG. 2 is a flow diagram illustrating additional steps of the sequence generating method.

FIG. 2 is a flow diagram illustrating additional steps of the test sequence generating method of FIG. 1. The method continues from step S1 of FIG. 1. A next step S10 provides an initial intra-predicted picture (I-picture). This picture preferably codes a pre-defined color pattern. A preferred example of such a pattern is to have a single color for all pixels in the picture. This step S10 may be omitted for the embodiment where the test sequence comprises multiple intra pictures.

According to the H.263 baseline standard, a uniformly colored intra picture can be obtained by setting all AC coefficients for the intra macroblock in the picture to zero. The DC coefficients of the macroblocks are set to the desired (single) color. With the H.263 standard with Annex I or MPEG-4 Part 2 video, the AC coefficients are again set to zero. Regarding the DC coefficients, it is sufficient to set the desired color only on the first macroblock. DC prediction is then used for the remaining macroblocks in the intra picture. Due to this DC prediction, a uniform intra picture can be coded with fewer bits compared to the H.263 baseline standard. The H.264 standard has prediction in the pixel domain but is otherwise similar to the case with H.263 with Annex I or MPEG-4 Part 2.

If utilizing the embodiment of inter-predicted pictures, the predefined color, chrominance and/or luminance of the intra picture is furthermore different from the color, chrominance and/or luminance selected for the intra-coded pixel groups in the sequence of inter pictures. This allows the individual intra groups to be clearly identifiable in the rendered media data relative the background color of the intra picture (or pre-defined background color in the case of no intra picture).

The provided intra-predicted picture is packed into a data packet in a next step S11. The method then continues to step S2 of FIG. 1. In this case, the media test sequence comprises the intra picture data packet followed by the multiple inter picture data packets.

FIG. 3 illustrates a sequence 1 of inter-predicted pictures 20-26 preceded in time by an initial intra picture 10 according to the present invention. In the figure, the uniform color of the intra picture 10 has been represented by black. A first inter picture 20 comprises an intra-coded pixel group 30 having a uniform color (white) different from the background color of the intra picture 10. Furthermore, this intra group 30 is positioned at a dedicated, specific pixel position in the inter picture 20. The remaining pixel groups 40 of the picture 20 are inter pixel groups preferably coded as skipped pixel groups (represented in the figure through the usage of the same color as the background color of the intra picture 10).

The following inter pictures 22, 24, 26 have all a respective intra-coded pixel group 32, 34, 36 uniformly colored in the same color as in the first inter picture 30. However note how the respective relative positions of these intra groups 30-36 in the inter pictures 20-26 differ among the pictures 30-36. In the latter inter pictures 22, 24, 26 both the previous groups 52, 54, 56 and the following picture groups 42, 44, 46 relative the intra groups 32, 34, 36 are inter-coded, preferably according to the skip mode.

FIGS. 4A to 4H illustrate the visual effect of decoding and rendering the data packets of the digital test sequence of the invention in a user terminal. FIG. 4A illustrates the complete refresh of the decoded picture upon rendering the initial uniformly colored intra picture. The display screen will therefore preferably present a media presentation 60 with a uniformly colored background image or color 62. The next-coming packet contains an inter-predicted picture encoded with a different chrominance and/or luminance (with respect to the uniform color of the intra picture) of the pixel group (macroblock) in the upper left corner followed by skipped macroblocks (zero-difference inter macroblock) for the rest of the picture. Due to this skipping mode, the remaining pixels 62 will be assigned the background color of the initial intra picture in the media presentation 60 of FIG. 4B. This FIG. 4B illustrates the displayed resulting image after decoding and rendering the first inter-predicted picture. Only those pixels corresponding to the intra-coded pixel group 64 have an assigned color that is different from the background color 62. Thus, only the white part 64 of FIG. 4B comes from the latest inter picture, while the rest 62 of the picture has zero difference meaning that the rest of the decoded picture is from the first intra picture.

As each following inter-predicted picture is decoded and rendered a new differently colored pixel group is added at a specific pixel position in the image. FIG. 4C illustrates the resulting displayed image after rendering of two inter-predicted images, thereby displaying two pixel groups 64 having a first color while remaining groups 62 have the background color. Since the first pixel group in this second inter-predicted picture is preferably inter skip-mode coded, the pixels corresponding to this pixel group will have the color of the corresponding pixels in the previous image of FIG. 4B.

This procedure is continued for remaining inter-predicted pictures in the sequence. FIG. 4D illustrates the result after one intra picture packet and 28 inter picture packets without any losses. Here each inter picture has contributed with one new white square 64.

However, if there are any packet losses during the delivery of the data packets of the test sequence, there will be missing white (in this particular example) blocks in the display screen. FIG. 4E illustrates such an event. In FIG. 4E the second, 17th and 18th inter picture packets have been lost, i.e. not being received and/or decodable at the user terminal. As a consequence, those areas 66 of the image corresponding to the specific pixel positions of the respective intra pixel groups in these three inter pictures instead have the background color of the first intra picture, i.e. black in this example. As is seen in the figure, the test sequence of the present invention allows, in an efficient and simple way, identification of the number of lost data packets and also the particular data packets that were lost due to the specific relationship between the pixel position of intra-coded pixel group and the inter picture.

At the moment when the last inter-predicted picture packet for a full cycle has been received, the decoded image may look like the one illustrated in FIG. 4F. In this case there have been six packet losses out of 49 packets (1 I-picture+48 P-pictures), corresponding to 12% packet loss.

In the figures the respective intra pixel group positions of the inter pictures have been shifted between non-overlapping positions along the first row and then going through the remaining rows row by row. This should, however, merely be seen as an illustrative example. For instance, the intra group positions can instead shift along the first column and then go through the other columns column by column. Actually any shifting of the intra group positions between different inter pictures in the sequence is possible as long as each inter picture has a unique position for its intra group that is different from and preferably non-overlapping relative the position of the intra group in another inter picture for a full cycle of inter pictures in the sequence.

The digital test sequence of the present invention can then comprise further data packets repeating a new cycle of an initial intra picture followed by multiple inter-predicted pictures each having an intra pixel group at a specific picture position. FIG. 4G illustrates the result after reception, decoding and rendering of a new intra picture. This leads to a refresh of the image displaying all pixels at the (background) color 62 specified in the intra picture. This background color can be the same color as the background color of the first intra picture in FIG. 4A but is preferably a different color as schematically illustrated in FIG. 4G.

The data packet carrying this second intra picture may indeed become lost. In such a case since no image refresh is taking place, it would no longer be possible to detect following inter pictures if their respective pixel groups have the same color as in the first cycle. As a consequence, in a preferred embodiment the color of the pixels in the intra groups of the inter-predicted pictures are changed between different complete cycles in the test sequence. FIG. 4H illustrates this concept if the second intra picture was lost. In the figure the three first inter pictures of the second cycle and the fifth inter picture have been correctly received. However, the fourth inter picture was lost. This means that the pixel group position 66 associated with the lost picture has the color these pixels had after completion of the first cycle. This means that the color could be the color assigned to the intra pixel groups of the inter pictures of the first cycle as in the figure. Alternatively, if also the fourth inter picture of the first cycle was lost, these pictures would in the present example have the (black) color of the first intra picture.

The colors used according to the present invention for the intra pictures and the intra groups in the inter pictures can be chosen quite arbitrarily. There is no limitation to keeping the luminance values of the pixels uncorrelated with the chrominance. However, as mentioned above, the colors of the pixels in different intra pictures preferably differ for a given test sequence, i.e. have different chrominance and/or luminance. Preferably, the colors of the pixel in the intra groups of the inter pictures within a given cycle are preferably the same but preferably different from the colors of the intra group pixels of the inter pictures of another cycle.

According to the present invention, the expression "color" is used to denote any pixel color in any color format, such as RGB, YUV, YCrCb, etc. The pixel color may also be a grey scale, which then would correspond to changes in the luminance while keeping the chrominance constant. Therefore, the usage of the expression color herein also covers such grey scales. Two pixels having different colors could be regarded according to an embodiment as having different chrominance values, different luminance values or different chrominance and different luminance values.

The embodiment discussed above utilizing inter-predicted pictures each having at least one dedicated intra-coded pixel group has the advantage that it provides, during rendering, a visual memory. This means that following rendering a cycle of inter pictures, any packet losses are clearly identified in the "final" media presentation, such as illustrated in FIG. 4F. This visual memory significantly facilitates the user-identification of the number of lost packets.

The embodiment of the invention instead utilizing a sequence of intra pictures each having at least one dedicated intra-coded pixel group that is visibly identifiable relative remaining pixels in the picture does not have such a visual memory. In clear contrast, during rendering the differently colored pixel group will be seen as moving from block position to block position in the media presentation as new intra pictures are being decoded and rendered. A loss of a packet will be noticed as a jump of the moving pixel group in its path over the displayed media presentation. In such a case, the user would then count the number of such jumps during a cycle in order to determine the number of lost packets.

Figure 5:
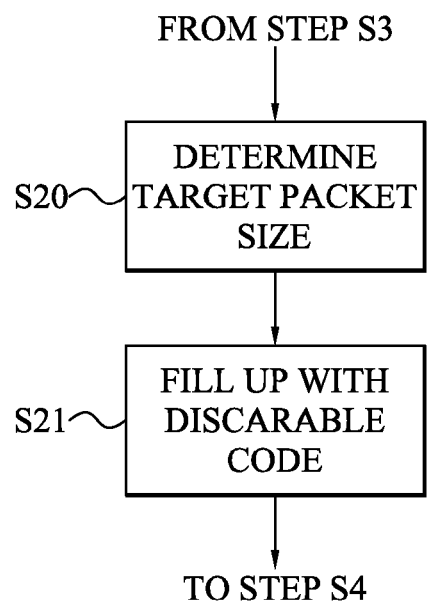
FIG. 5 is a flow diagram illustrating additional steps of the sequence generating method.

The test sequence of the present invention can be coded to a particular bit rate by adjusting the respective packet sizes of the data packets carrying the inter and intra pictures of the test sequence. FIG. 5 is a flow diagram illustrating preferred additional steps of the test sequence generating method of FIG. 1. The method continues from step S3 of FIG. 1. The sequence generating server has previously determined the particular bit rate that the sequence should be adapted for. This bit rate can set or requested by the user terminal requesting the sequence. In such a case, the sequence request received in step S1 of FIG. 1 can contain a notification of the desired bit rate. Such a request could be like rtsp://constantrate.video.com?b=48000, where the b parameter specifies the video bit rate that is desired. Another possibility is to put the parameters into the base part of the URI and not in the query string, e.g. rtsp://constantrate.video.com/b/48000.

In an alternative approach the server will pre-encode multiple versions of the test sequence, where each sequence version is adapted for a particular bit rate. In such a case, the information of the particular bit rate is not received from the user terminal but is typically pre-encoded in the server.

In either case, information of the desired bit rate is employed for determining a target packet size for the data packets of the test sequence in step S20. In a preferred embodiment, the data packets of the sequence are made such they all have the same size. In order to achieve the target bit rate and the data packet size required for such a target bit rate, the data packets are filled up or stuffed with discardable code or bit patterns in step S21. These bit patterns are later discarded by the decoder and will not affect the rendering of the pictures but merely functions as packet filler. For H.263 and MPEG-4 part 2, one possible alternative is to use the 9-bit code $000000001_{bin}$, in the MCBPC (Macroblock type and Coded Block Pattern for Chrominance) code. This 9-bit code can be repeated as many times as one wants in order to fill up the data packets to the target size. In H.264, additional NAL (Network Adaptation Layer) units can instead be sent to achieve the target bit rate. The method then continues to step S4 of FIG. 1 where the video data and the discardable code is packet into the data packets.

Figure 6:
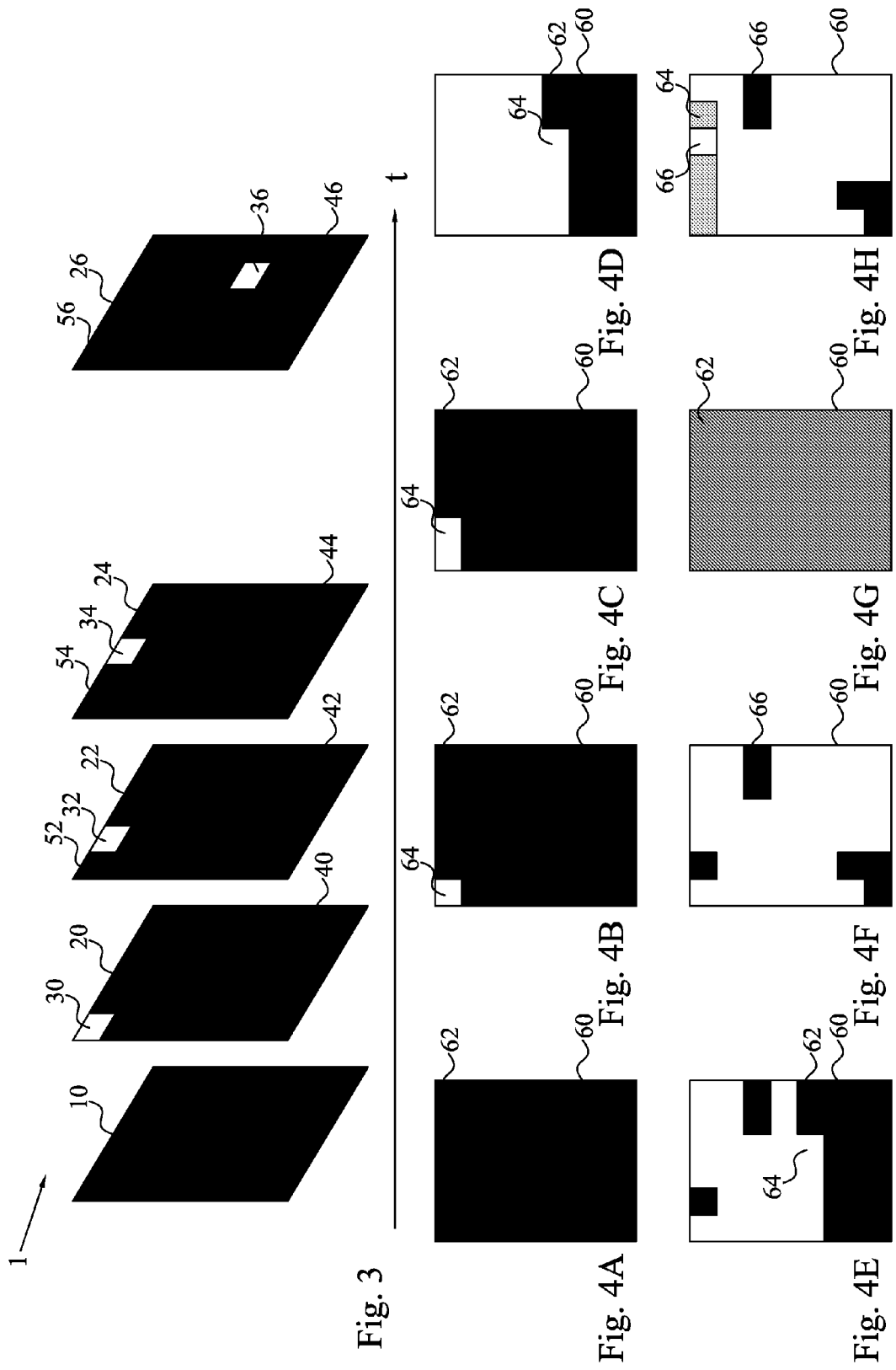
FIG. 6 is a schematic illustration of a data packet comprising media data according to an embodiment of the present invention.

FIG. 6 is a schematic illustration of a data packet 90 of the test sequence of the invention. The data packet 90 comprises a header portion 92, which is well-known in the art. The payload portion of the packet 90 comprises the media data 94 in the form of the code for the intra or inter pictures of the invention. The discardable code 96, if present, is hinted in the figure as multiple repeated units of the selected bit pattern. The actual order of the including portions 92, 94, 96 of the data packet 90 may be different from what is illustrated in the figure. The packet 90 may also include other information units traditionally employed in video/media data packets.

If the data packets of the test sequence or at least the packets of a cycle in the sequence have the same packet size, the test sequence of the invention can be used not only for identifying packet losses at a user terminal. In clear contrast, the number of lost packets also gives information of the throughput for the particular session. For instance, if 10% of the packets in the sequence are lost, the throughput is 90% of the maximum throughput for the given bit rate.

In a particular embodiment of the present invention, the test sequence comprises a first set of data packets having a first packet size and adapted for a first bit rate followed by at least a second set of packets with a second different packet size and adapted for a second different bit rate. FIG. 7 illustrates such an embodiment. The method continues from step S4, where the data packets of the first set have been filled up to the first packet size with the pictures of the first set. This set preferably comprises the first intra picture and the following inter pictures up to a next intra picture of the sequence in the case of the inter picture embodiment. If instead solely using intra pictures, the set preferably comprises the intra pictures, the specific intra-coded pixel groups of which together covers the whole display screen. In other words, if a media presentation allows at most 99 intra-coded pixel groups to be displayed together, the set could comprise 99 intra pixels each having one of the 99 possible positions for its specific intra-coded pixel group.

Thereafter the target packet size is changed in step S30. The next data packets containing the second cycle of pictures have this changed target packet size. The new size could be smaller than the first size or larger. In such a case, the test sequence is configured to automatically step down or up (depending on whether the changed size is smaller or larger than the initial packet size) in bit rate after each cycle of pictures. This procedure can be repeated for any third and following cycle of pictures and data packets in the sequence. The method then continues to step S2 in FIG. 1, where the pictures of the new cycle are provided.

In this approach, the pixels of the intra picture and the pixels in the intra groups of the inter pictures or intra pictures of the different cycles preferably have predefined colors. In addition, the respective colors are dictated by the particular bit rate that the data packets of the cycles are encoded for. For instance, intra picture pixels of a bit rate $R_1$ have all color $c_1$. The pixels of the intra groups in the P pictures of bit rate $R_1$ have color $c_2$. The corresponding colors in the case of a second bit rate $R_2$ are $c_3$ and $c_4$ and so on. In the case of using only intra pictures, the pixels of the specific intra-coded groups could all have a color $c_1$ while remaining pixels in the intra pictures have a different color $c_2$ for the first bit rate $R_1$. Using the second bit rate $R_2$ the colors are instead a third color $c_3$ for the specific intra groups, while the remaining pixels can still have the second color $c_2$ or a fourth color $C_4$.

Combining this special coloring with an automatic change in data packet size and bit rate after each cycle completion, provides a visually efficient tool for the user to identify the particular bit rate where packet losses start to appear or where packet losses no longer are present. The user is then aware of the predefined relationship between pixel color and bit rate.

This embodiment of the invention is in particular suitable in connection with adaptive streaming. Adaptive streaming is a delivery technique that is advantageous for networks with varying characteristics, such as wireless and cellular networks. Using adaptive streaming, the media server varies the media bit rate (and quality) depending on feedback from the client, the network or other monitors. This bit rate adaptation is typically performed in such a way that packet losses are kept at a minimum while the media bit rate used should be close to what can be transported through the network. Typically, the server switches between different pre-encoded or live streams and fuse them into one continuous stream with varying bit rate which is optimal for each individual receiver.

The present invention can be used to evaluate adaptive streaming algorithms in a simple manner. One way is that the server has a number of test streams with different bit rates and using different coloring as discussed above. It is then very easy to detect on the receiver side what bit rate is being used, how often the server switches bit rate, if there are any packet losses before the server switches and if the switch occurs at an intra picture.

Video can typically be encoded at varying bit rates but there may be limitations defined by the respective standards in the field. On the lower bit rate side, the limitations come from the number of bits required to encode a picture. For example, a uniform intra picture of the invention with H.263 baseline, i.e. without Annex I, requires 53 bits per macroblock plus some header bits. As a consequence, the minimal packet size becomes 683 bytes including IP/UDP/RTP headers for a sub-QCIF (Quarter Common Intermediate Format) image of 128×96 pixels. This image type is currently the smallest picture format for H.263 baseline. If constant bit rate is desired so that all inter pictures should have the same size, the minimal bit rate for 5 Hz video becomes around 27 kbps. However, other standards and H.263 with Annex I typically require much fewer bits since it uses prediction in intra pictures as mentioned above.

On the upper bit rate side, there are two main limitations, the MTU (Maximum Transmission Unit), which is the maximum size of an IP packet that can be transported in the network without fragmentation, typically 1500 bytes, and the maximum frame rate, which is typically 15 Hz or 30 Hz. If the test sequence has exactly one data packet per picture, then the maximum bit rate possible is 1500 bytes×8×15 Hz=180 kbps or 1500 bytes×8×30 Hz=360 kbps.

In some applications these bit rates of 180 or 360 kbps may be too low. The present invention can handle such a case by partition the pictures into multiple, i.e. at least two, data packets each and make them independent. A possible way of doing this would be to partition every picture into at least two independent units known as slices in H.264. The corresponding expression is video packet in MPEG-4. In the following discussion, the expression slice is employed for denoting such a picture partition unit. However, this is intended to encompass also such picture units denoted by a different name according to other video standards. Each such slice can be packetized into a respective data packet (IP packet).

FIG. 8 is a flow diagram illustrating this approach of the test sequence generating method. The method continues from step S1 of FIG. 1. A next step S40 provides, for at least one inter picture and preferably all inter pictures in the sequence, multiple inter-predicted slices or picture partition units. In such a case, these multiple inter-predicted slices are co-processable at the user terminal to form an inter-predicted picture. Furthermore, each slice comprises a respective group of intra coded pixels at a dedicated pixel position of the inter/intra-predicted picture. This means that during the co-processing and rendering of the slices of a picture, the resulting image will present one colored pixel group per slice in the displayed image. As a consequence, multiple colored pixel groups will appear for each rendered picture instead of a single pixel group per image as in FIGS. 3-4H. The method then continues to step S2 of FIG. 1, where the slices are packets into individual data packets of the sequence. In this case, a single packet loss will be noticeable during rendering as a loss of one of the patterns being influenced.

FIG. 9 illustrates this concept of slices in more detail. In contrast to FIG. 3, in this case each intra and inter picture is divided into two slices. The test sequence 1 therefore comprises, in this example, the two slices 10A, 10B of the initial uniformly colored intra picture. This intra picture is followed by the respective slices 20A, 20B; 22A, 22B of the inter pictures. Each such slice has a (uniformly colored) intra pixel group 30A, 30B; 32A, 32B at a dedicated position in the slice, where this position is associated with and preferably unique for the particular inter picture. Any previous 52A, 52B and following 40A, 40B; 42A, 42B pixel groups in the slices 20A, 20B; 22A, 22B are preferably inter skip-coded or at least have zero motion vectors and zero prediction errors.

FIGS. 10A to 10C illustrate the result of rendering the test sequence of FIG. 9 having multiple picture slices. The rendering starts with the uniform intra picture slices in FIG. 10A resulting a preferred initial media presentation 60 of a uniform background color 62. Thereafter the first two slices are co-processed and rendered into a picture in FIG. 10B. As each slice comprises a respective intra pixel group having a different color than the uniform background color of the first intra picture, two colored pixel groups 64 will (in the case of no packet losses) appear in the image. FIG. 10C illustrates the result after rendering of the two slices of the second picture. This means that in this case two color pixel groups 64 will appear per rendered picture in the case of no packet losses.

This concept of utilizing multiple slices per inter-picture can also be applied to the case when the test sequence comprises multiple intra-pictures. In such a case, each intra-picture is divided into multiple intra slices, where each such slice comprises a specific intra-coded pixel group at a dedicated pixel position associated with the intra picture.

When having multiple new patterns, i.e. intra coded pixel groups, in each inter picture, there may be a risk that the concealment mechanism in the decoder will interpolate data and thereby hide packet losses. However, as long as there are at least one and preferably at least two rows of unchanged macroblocks (inter coded or skipped pixel groups) in between the intra coded macroblocks in a given picture, the decoder will not conceal any losses.

Figure 11:
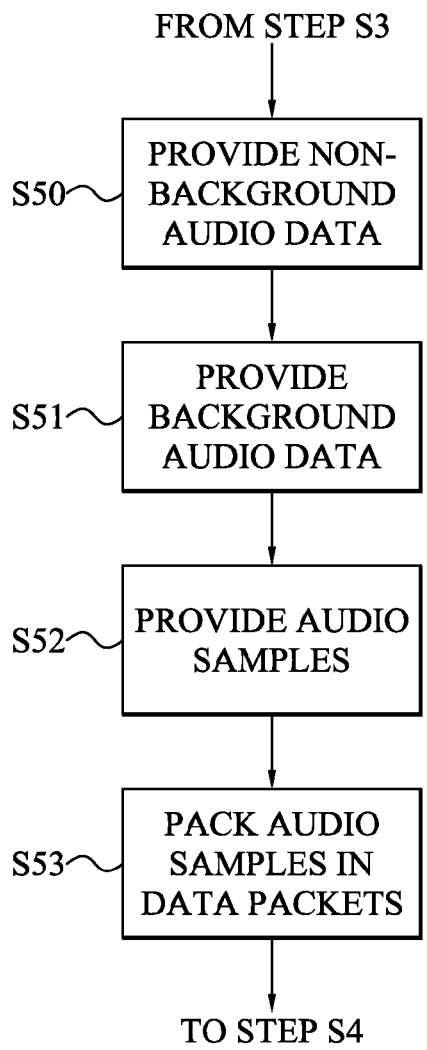
FIG. 11 is a flow diagram illustrating an additional step of the sequence generating method.

The test sequence of the invention can also be used for providing further valuable information besides packet losses and throughput information. The sequence can also be used for analyzing synchronization between a first media type, e.g. video, and a second media type, e.g. audio. FIG. 11 illustrates additional steps of the sequence generating method to provide synchronization analyzing capability. The method continues from step S3 of FIG. 1. A next step S50 provides so-called non-background audio data. This audio data provides an identifiable audio effect that is different from the audio effect of background audio data provided in a next step S51. In a typical embodiment the background audio data could be silent audio, while the non-background audio data could be in the form of a beep or some other audible sound. The non-background audio can, for instance, be synthetic audio or recorded audio.

The next step S52 provides a sequence of multiple audio samples based on the provided non-background and background audio data from step S50 and S51. Each such audio sample is intended for being synchronized to a respective inter-predicted or intra picture of the test sequence. This audio sampling is preferably configured to provide non-background audio sample synchronized to selected inter or intra pictures in the sequence, while the remaining pictures are synchronized to (silent) background audio samples. For instance, the pictures having intra pixel groups positioned at the first position in every $k^{th}$ row in the image could be synchronized to a non-background audio sample. This means that when the video and audio data are rendered at the user terminal a beep or some other sound signal will be played when rendering the inter picture having intra pixel groups positioned at the first position in these $k^{th}$ rows. No sound, in the case of silent background audio, is played for the other pictures. The user can then identify any lack of synchronization between the playout of the sound signal and the display of the colored intra group of the picture that is intended to be synchronized with the audio sample.

The provided audio samples are then packed into audio data packets in step S53. In such a case, the test sequence comprises both video packets and audio packets. The method continues to step S4 of FIG. 1.

Figure 12:
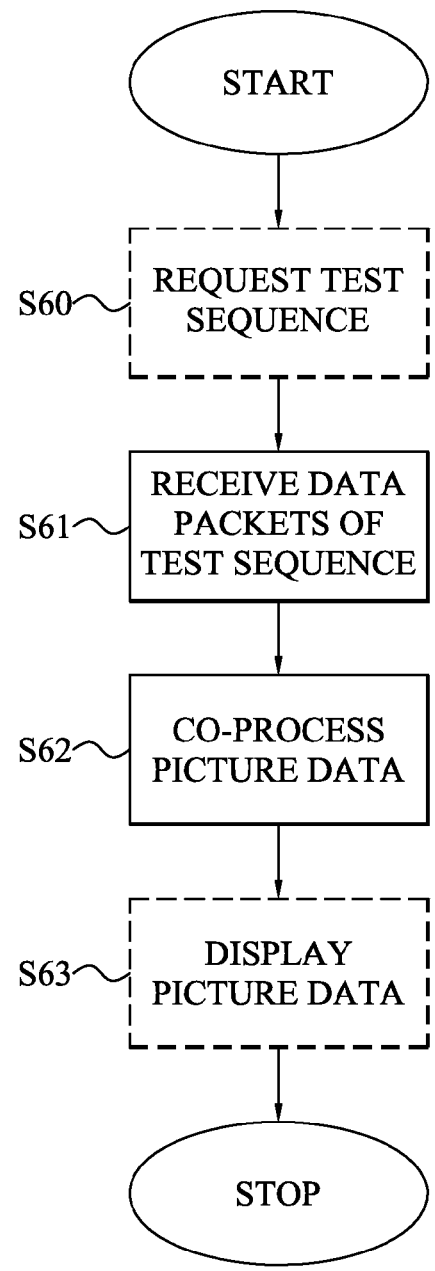
FIG. 12 is a flow diagram of a method of testing a data connection using a test sequence according to an embodiment of the present invention.

FIG. 12 is a flow diagram illustrating a method of testing a data connection between a transmitting end, such as media server, and a receiving end, such as user terminal. A first optional step S60 comprises compiling and transmitting a request for a data test sequence to be used in the test procedure. This request is transmitted from the user terminal to the sequence providing server. The request can be, as was previously discussed, in the form of an RTSP URI to choose the appropriate test sequence content from the server. The request may further state a desired bit rate, such as rtsp://testserver.com/cr64.sdp, rtsp://testserver.com/cr128.sdp, rtsp://testservencom/cr256.sdp for fixed URIs or rtsp://testserver.com/br=64000&format=qcif&pktSie=1000, rtsp://testservencom/br=82000&format=qvga&pktSize=900 for parameterized URI, where in this case both target bit rate, image format (QVGA, Quarter Video Graphics Array) and packet size are notified in the request.

The server provides either a pre-produced test sequence or creates it on the fly depending on the provided parameters.

It is, thus, possible to perform transport link tests at different bit rates, image sizes and packet sizes by either choosing from a pre-defined set of test sequence versions or provide parameters via the sequence request. Thereby, it is even possible to create new test cases from the user terminal.

In the next step S61 the terminal receives the data packets of the test sequence from the server. The picture data of the sequence is co-processed (decoded and rendered, among others) in step S62 to form a media presentation, such as video, in which the intra coded pixel groups of the pictures in the sequence are individually identifiable. As a consequence, any lost data packet can be identified as a missed intra coded group in the media presentation as previously disclosed.

In an optional but preferred embodiment, the method continues to step S63 where the media presentation is displayed allowing the user to identify any packet losses. The method then ends.

The present invention is though not limited to being displayed at the terminal. In clear contrast, the terminal can contain a simple image processing functionality or algorithm that identifies, in the final image or media presentation after one complete cycle, the number of pixel groups that are colored according to the background color of the first initial intra picture or the predefined background color defined by the decoder. This number gives the packet loss parameter.

FIG. 13 is a flow diagram illustrating additional preferred steps of the communication testing method of FIG. 12. The method continues from step S63 in FIG. 12. In a next step S71, the number of missed pixel groups in the media presentation is counted. These missed intra groups are preferably identifiable as being differently color than remaining pixels in the media presentation. This counting can be performed manually by the user or by the above-mentioned image processing functionality in the terminal. In an alternative embodiment the packet losses are identified as jumps in the movement of the differently colored intra pixel group along its path in the media presentation.

A next step S72 generates a quality parameter representative of the quality for the data connection based on the counted number from step S71. Thus, this parameter can simple be the number of lost packets, the quotient between the number of lost packets and the total number of data packets, the number of correctly received and decoded packets, the quotient between the number of correctly received and decoded packets and the total number of data packets, the ratio between lost packets and received packets or some other representative parameter. Depending on the particular parameter type selected and also whether the data packets have been generated to be of a same size, the parameter may also represent the throughput of the data communication.

The generation of the quality parameter can be performed manually by the user. Alternatively, the user can enter, on the terminal, the number of lost packets counted in step S71. The terminal then uses this number for calculating the desired quality parameter. In yet another embodiment, the terminal itself counts the number of lost packet by the image processing algorithm and automatically generates the quality parameter based on this number.

In an optional step S73, the generated quality parameter is reported by the terminal to another defined network node or report facility in the network. The reported parameter is of high value for investigating the behavior of the network and can be used for conditioning the network and/or as basis for any network expansion or development. The parameter reporting can be performed automatically by the terminal, upon a specific request from the external server/node/report facility or by the user himself/herself.

In a typical scenario the user either himself/herself initiates a test session such as before or in connection with a media session. Alternatively, the user may have previously participated in a media session but noted that there were several problems due to packet losses. The user then compiles and transmits, using the terminal, a request for a test session, typically at a given start bit rate. If following the end of the test sequence, the number of packet losses is unacceptable high, the user can initiate a new test session by requesting a new test sequence, however, encoded at a comparatively lower bit rate. Correspondingly, if the results of the first test session did not show any packet losses or merely very few losses, a new test sequence encoded at a higher bit rate could be tested.

In a further embodiment, the test sequence is divided, as previously discussed, into a number of cycles. In such a case, the bit rate can automatically be stepped up or down at each new cycle. The user could then identify the most suitable bit rate, i.e. highest possible bit rate without unacceptable high packet losses.

In yet another embodiment, the user terminal comprises a bit rate estimating functionality that uses information of a tested bit rate and the resulting number of packet losses as input data. An optimal bit rate for the current data connection conditions is then estimated as a function of the input data. Such a function or mapping table can be generated based on a statistically analysis using data collected by multiple user terminals at different occasions.

In either case, once the user or user terminal has concluded a suitable bit rate, a media session can be started, where the requested media data is delivered at the bit rate determined from the test session involving the test sequence of the invention.

FIG. 14 is a flow diagram illustrating additional steps of the data connection diagnosing method. These steps are performed for analyzing the synchronization between video and audio. In such a case, the test sequence also comprises audio data packets comprising background or non-background audio data as previously described.

The method continues from step S63 of FIG. 12. A next step S80 plays back the audio data included in the received audio samples in parallel with the co-processing and display of the video/picture data. The synchronization between video and audio is investigated in step S81 by identifying when the non-background audio is played back relative the display of the associated picture that should ideally be synchronized to the audio sample. The method then ends.

The test sequence of the present invention and the data connection monitoring procedure involving the test sequence can be used for different purposes. For instance, experts or network monitoring personnel can use the present invention instead of special test terminals, such as TEMS™ units, for conditioning and monitoring the network. Furthermore, users that are watching video streamed or otherwise received to their terminals can start or be requested to start a test session if the experienced video quality is poor. The current quality of the server-terminal connection can thereby be tested and a suitable bit rate be estimated.

In a further approach, the terminal itself triggers a test session upon a triggering event. Such an event could be the initiation of a media session by the user or reception of a trigger command from a network node. The terminal reports quality data generated in the test session and reports this data to a network node. There this reported data can be used in a same way as diagnostic data collected by the expert TEMS™ units. The reported data can in addition or alternatively be used by a media server for selecting a suitable target bit rate for media data to be transmitted to the terminal in an initiated media session.

FIG. 15 is a schematic overview of a communication network 80, to which the present invention can be applied. The network 80 has non-limitedly been illustrated as a wireless mobile communication system. However, this should merely be seen as an illustrative example. A user terminal 200, such as a mobile telephone, computer or laptop, can be involved in a test session using a test sequence of the invention in order to monitor a data connection between the terminal 200 and a network node 75, such as a base station. The network 80 also comprises a media server 70 comprising or being connected to a test system 100 of the invention for generating the test sequence. This media server 70 and test system 100 can be implemented in the network node 75 or be in (wired or wireless) connection with the node 75.

Figure 16:
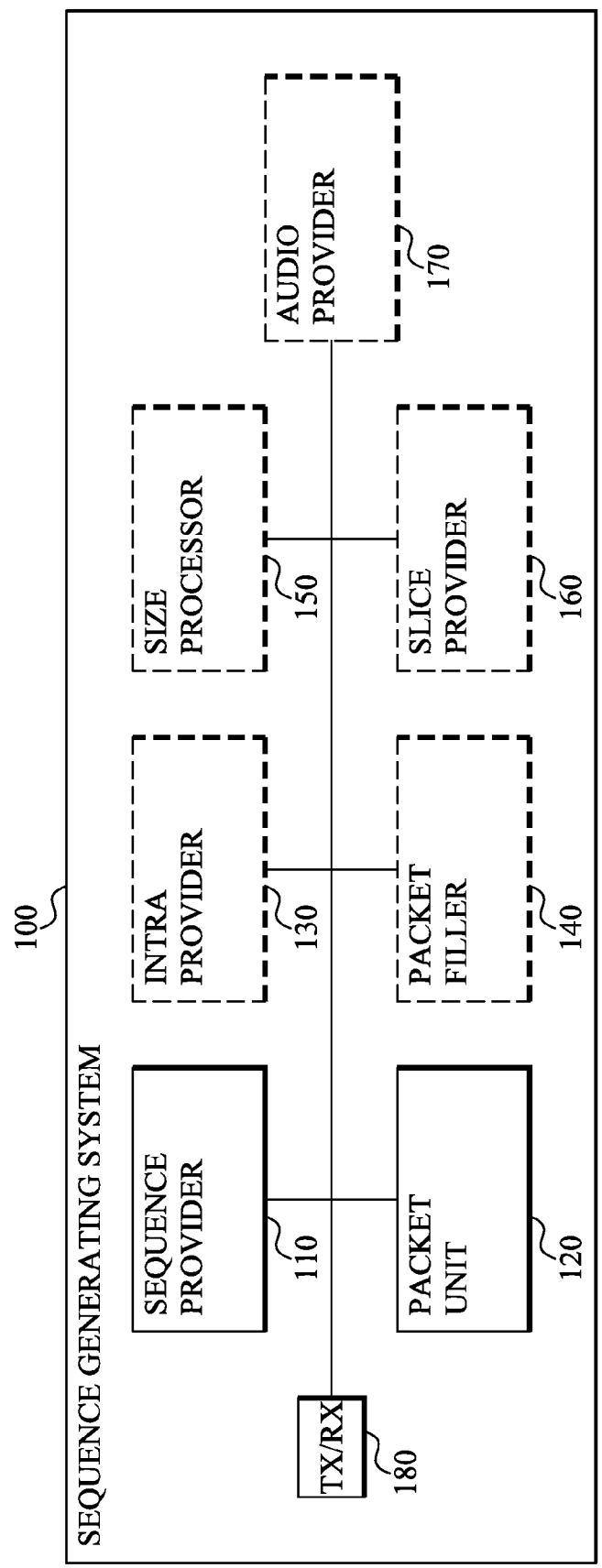
FIG. 16 is a schematic block diagram of a sequence generating system according to an embodiment of the present invention.

FIG. 16 is a schematic block diagram of a sequence generating system 100 according to an embodiment of the invention. The system 100 comprises a sequence provider 110 for providing the test sequence comprising multiple inter- or intra-predicted pictures having at least one respective intra coded pixel group at a specific group position. A packet unit 120 of the system packs the provided pictures into multiple data packets to form the digital media test sequence. The packet unit 120 preferably packs at most one picture per data packet but could, as has been previously discussed, distribute the data of one picture among multiple data packets.

An optional intra provider 130 is also arranged in the system 110. This provider 130 provides an initial intra predicted picture preferably having a predefined single color of its pixels. This initial intra picture is provided in those embodiments where inter-predicted pictures are provided by the sequence provider 110. The packet unit 120 packs this intra picture into one or among multiple data packets. The intra provider 130 preferably also provided new intra pictures, preferably having different single color than the first one. These pictures are inserted in the test stream following completion of one cycle, i.e. providing a number of inter pictures where the intra pixel groups of these pictures together covers the complete image of the media presentation during rendering of the test sequence.

The data packets of a test sequence or at least during a cycle of the sequence preferably have a same packet size. This can be achieved by a packet filler 140 that fills up any remaining packet portion to reach the target size. In such a case, the filler 140 can add one or multiple copies of a predefined discardable code to the packets.

The target packet size can be predefined or be selected by a size processor 150 of the generating system 100. In such a case, the processor 150 can inform the packet filler 140 of the target packet size. This size processor 150 preferably receives input data from a receiver 180 of the system 100. This input data is typically in the form of a requested bit rate included in the sequence request transmitted by the user terminal. In such a case, the processor 150 uses this target bit rate information to determine a matching packet size to achieve the target rate.

In an alternative approach, the processor 150 informs the packet filler 140 to step up or down the packet size after each cycle of the test sequence.

As has been previously discussed, a picture can be divided into multiple slices. The system 100 therefore preferably comprises a slice provider 160 implemented for providing multiple slices for each intra and/or inter picture to be partitioned. The packet unit 120 then packs each such picture slice into a separate data packet.

An optional audio provider 170 is provided for providing a sequence of multiple audio samples that are synchronized to a respective picture of the test sequence. Some of these audio samples comprise non-background (non-silent) audio data, while the remaining majority comprises background (preferably silent) audio data. The packet unit 120 packs these audio samples into audio packets that are included together with the video packets in the test sequence.

The system 100 preferably also comprises a transmitter 180 provided for transmitting a generated test sequence to a requesting user terminal.

The units 110 to 180 of the generating system 100 can be provided in hardware, software and/or a combination of hardware and software. The units 110 to 180 can be implemented in a media server, such as implemented in or connected to a node of a wired or wireless communications system.

Figure 17:
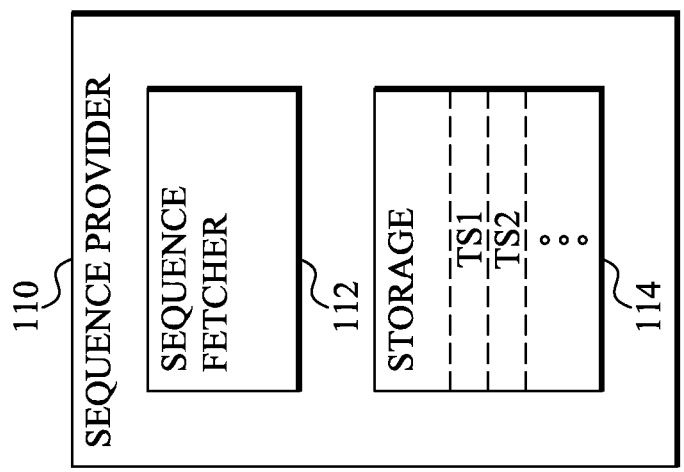
FIG. 17 is a schematic block diagram of an embodiment of the sequence provider of the sequence generating system.

FIG. 17 is a schematic block diagram of a possible implementation of the sequence provider 110 of the sequence generating system in FIG. 16. In this implementation the sequence provider 110 is arranged for pre-generating multiple test sequence versions encoded for different bit rates. The provider 110 therefore comprises a memory or database 114 with a library or set of multiple such test sequence versions. When the sequence generating system receives a request for a test sequence and the request comprises a desired target bit rate, a sequence fetcher 112 fetches a test sequence version from the memory 114 that is encoded for the target bit rate or best matches the target bit rate.

As was discussed previously also other parameters can be used, such as image format and packet size. The different test sequence versions can therefore be encoded for different bit rates and/or different image formats and/or different target packet sizes.

The units 112 and 114 of the sequence provider 110 can be provided in hardware, software and/or a combination of hardware and software. The units 112 and 114 can all be implemented in the sequence provider 110. Alternatively a distributed implementation with at least one of the units 112 and 114 implemented elsewhere in the sequence generating system 100 is possible.

Figure 18:
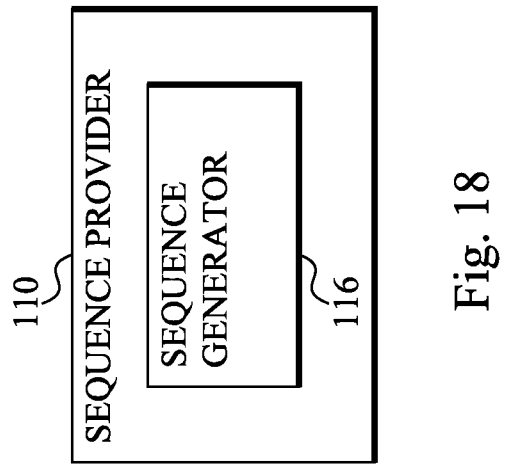
FIG. 18 is a schematic block diagram of another embodiment of the sequence provider of the sequence generating system.

FIG. 18 illustrates another possible embodiment of the sequence provider 110 of the invention. In this embodiment, the provider 110 comprises a sequence generator 116 that generates a test sequence on the fly when the sequence generating system receives a sequence request. In such a case, the generator 116 preferably generates and encodes the sequence to suit a target bit rate, image format and/or packet size requested by the user terminal.

The unit 116 of the sequence provider 110 can be provided in hardware, software and/or a combination of hardware and software. The unit 116 can be implemented in the sequence provider 110. Alternatively a distributed implementation with the unit 116 implemented elsewhere in the sequence generating system 100 is possible.

Figure 19:
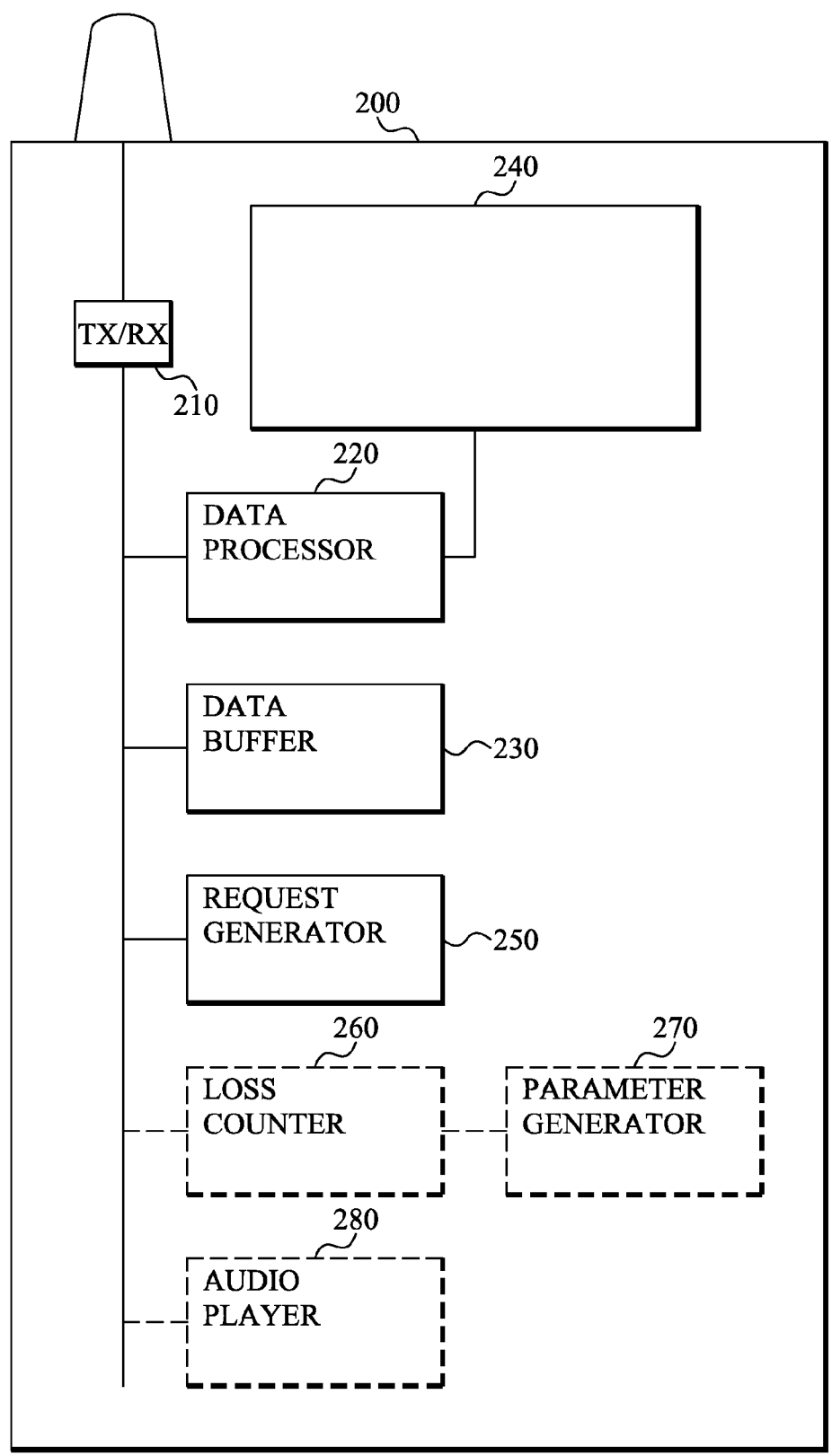
FIG. 19 is a schematic block diagram of a device for testing a data connection according to an embodiment of the present invention.

FIG. 19 is a schematic block diagram of a device or terminal 200 employed for testing a data connection between the device 200 and a transmitting unit. The device 200 is preferably a user device or terminal having communication equipment and media processing capability. Examples of such devices 200, includes mobile telephones, laptops and other portable processing devices, computers, etc.

The device 200 comprises a request generator 250 arranged for generating a request for a test sequence of the invention. The generator 250 can optionally include target bit rate, image format and/or packet size information in the request. In such a case, this information can be provided based on user input to the device. The compiled request is transmitted by a transmitter 210 to a media server providing the test sequence.

The device 200 also comprises a receiver 210 arranged for receiving the requested digital media test sequence. A data or media processor 220 comprises functionality, such as decoder, rendering unit, etc., employed for co-processing the picture data of the test sequence to form a displayable media presentation. This media presentation is preferably displayed at a connected display screen 240. In such a case, individual intra coded pixel groups of the inter pictures in the sequence can be easily seen and a packet loss is identified as a missed group in the media presentation.

A loss counter 260 may be implemented in the device 200 for processing the media presentation and counting the number of pixel groups (macroblocks) therein that has the background color of the intra picture in the sequence or the starting default background frame/picture. A connected parameter generator 270 uses this counted number of missing pixel groups to determine a quality parameter representative of the number of packet losses and therefore the quality of the communication channel or link between the device 200 and the transmitting unit (media server or network node). In an alternative approach, the generator 270 generates the quality parameter based on data input by the user. In such a case, the user counts the number of missing intra blocks in the displayed media presentation in the screen 240 and enters this number on an input device (not illustrated) of the device 200.

The device 200 may optionally include an audio player 280 arranged for playing back audio data processed (decoded) by the data processor 220. These audio samples are included in separate audio packets of the test sequence and should ideally be synchronized with the pictures. As the audio samples preferably comprise non-background sound data at selected intervals with background sound therebetween, the user can investigate the synchronization between the sound rendering and the video rendering.

The units 210-230, 250-280 of the device 200 can be provided in hardware, software and/or a combination of hardware and software.

The present invention provides new means of testing and evaluating transport links with a simple terminal, such as streaming-enabled client. Thereby the cost for link testing will be considerable less and more people can perform the tests as compared to using experts with special test equipment.

Any packet losses during the test session are directly visible and do not interfere with each other. This means that it is very easy for the viewer to identify the actual number of packet losses and the packet loss rate compared to the total number of packets. This also provides a large pedagogical value to the users as they are able to directly observe any packet losses.

It will be understood by a person skilled in the art that various modifications and changes may be made to the present invention without departure from the scope thereof, which is defined by the appended claims.

REFERENCES

[1] ITU-T H.264, Series H: Audovisual and Multimedia Systems, Infrastructure of audiovisual services—Coding of moving video, Advanced video coding for generic audiovisual services, November 2007

The invention claimed is:
1. A method of generating a digital media test sequence comprising the steps of:
    providing an initial intra-predicted picture having a predefined single color;
    providing a sequence of multiple inter-predicted pictures, where each inter-predicted picture comprises at least one group of intra-coded pixels at a dedicated pixel position of said inter-predicted picture and remaining groups of pixels of said inter-predicted picture are inter-coded using skip mode or with zero motion vector and zero prediction error, wherein said dedicated pixel position of said at least one group of intra-coded pixels in a first inter-predicted picture of said multiple inter-predicted pictures is different from said dedicated pixel positions of said at least one group of intra-coded pixels in the remaining inter-predicted pictures of said multiple inter-predicted pictures;
    packing said intra-predicted picture into a first data packet;
    packing said sequence of multiple inter-predicted pictures into multiple data packets; and
    packing a sequence of multiple audio samples into multiple audio data packets, a first set of the multiple audio samples including non-background sound data synchronized to selected inter-predicted or intra pictures and a second remaining set of the multiple audio samples including background sound data synchronized to the rest of pictures in the sequence of multiple audio samples, wherein the digital media sequence includes the first data packet, multiple data packets, and the multiple audio packets.

2. The method according to claim 1, further comprising filling up at least one data packet of said multiple data packets with a predefined discardable code to reach a defined data packet size.

3. The method according to claim 2, further comprising changing said defined data packet size following providing a defined multiple number of data packets comprising pictures.

4. The method according to claim 1, further comprising the steps of:
providing multiple slices where said multiple slices are co-processable to form an inter-predicted picture of said multiple inter-predicted pictures and each slice comprises a group of intra-coded pixels at a dedicated pixel position of said inter-predicted picture; and
packing said multiple slices into multiple data packets.

5. A system for generating a digital media test sequence comprising:
an intra provider configured to provided an initial intra-predicted picture having a predefined single color
a sequence provider configured to provided a sequence of multiple inter-predicted pictures where each inter-predicted picture comprises at least one group of intra-coded pixels distinguishable from the predefined single color of the intial intra-predicted picture at a dedicated pixel position of said inter-predicted picture and remaining groups of pixels of said inter-predicted picture are inter-coded using skip mode or with zero motion vector and zero prediction error, wherein said dedicated pixel position of said at least one group of intra-coded pixels in a first inter-predicted picture of said multiple inter-predicted pictures is different from said dedicated pixel positions of said at least one group of intra-coded pixels in the remaining inter-predicted pictures of said multiple inter-predicted pictures; and
a packet unit configured to:
pack said intra-predicted picture into a first data packet and said sequence of multiple inter-predicted pictures into multiple data packets
pack a sequence of multiple audio sample into multiple audio data packets, a first set of the multiple audio samples including non-background sound data synchronized to selected inter-predicted or intra-pictures and a second remaining set of the multiple audio samples including background sound data synchronized to the rest of pictures in the sequence of multiple audio samples,
wherein the digital media test sequence includes the first data packet, multiple data packets, and the multiple audio packets.

6. The system according to claim 5, further comprising a packet filler configured to fill up at least one data packet of said multiple data packets with a predefined discardable code to reach a defined data packet size.

7. The system according to claim 6, further comprising a size processor configured to change said defined data packet size following providing a defined multiple number of data packets comprising pictures.

8. The system according to claim 5, further comprising a slice provider configured to provide multiple slices where said multiple slices are co-processable to form an inter-predicted picture of said multiple inter-predicted pictures and each slice comprises a group of intra-coded pixels at a dedicated pixel position of said inter-predicted picture, wherein said packet unit is arranged for packing said multiple slices into multiple data packets.

9. The system according to claim 5, further comprising an audio provider configured to provide the sequence of multiple audio samples.

10. A method of testing a data connection between a transmitting end and a receiving end of said data connection, said method comprising the steps of:
receiving, at said receiving end, a digital media test sequence from said transmitting end, said digital media test sequence comprises a first data packet comprising an initial intra-predicted picture having a predefined single color and a sequence of data packets comprising multiple inter-predicted pictures where each inter-predicted picture comprises at least one group of intra-coded pixels at a dedicated pixel position of said inter-predicted picture and remaining groups of pixels of said inter-predicted picture are inter-coded using skip mode or with zero motion vector and zero prediction error, wherein said dedicated pixel position of said at least one group of intra-coded pixels in a first inter-predicted picture of said multiple inter-predicted pictures is different from said dedicated pixel positions of said at least one group of intra-coded pixels in the remaining inter-predicted pictures of said multiple inter-predicted pictures; and
co-processing pictures received at said receiving end to form a media presentation in which said groups of intra-coded pixels are individually identifiable and a lost data packet being identifiable as a missed group of intra-coded pixels in said media presentation,
wherein said digital media test sequence further comprises data packets with audio samples each initial being synchronized to a respective inter-predicted picture of said multiple inter-predicted pictures and first set of said multiple audio samples comprising non-background sound data and a second remaining set of said multiple audio samples comprising background sound data, said method further comprising the steps of;
playing back sound data of said audio samples in parallel with said co-processing; and
investigating synchronization between video and audio based on a relative timing of playing back said non-background sound data.

11. The method according to claims 10, further comprising the steps of:
counting the number of missed groups of intra-coded pixels in said media presentation; and
generating a data connection quality parameter based on said counted number.

12. A device for testing a data connection between said device and a transmitting unit, said device comprising:
a receiver for receiving a digital media test sequence from said transmitting unit, said digital media test sequence comprises a first data packet comprising an initial intra-predicted picture having a predefined single color and a sequence of data packets comprising multiple inter-predicted pictures where each inter-predicted picture comprises at least one group of intra-coded pixels at a dedicated pixel position of said inter-predicted picture and remaining groups of pixels of said inter-predicted picture are inter-coded using skip mode or with zero motion vector and zero prediction error, wherein said dedicated pixel position of said at least one group of intra-coded pixels in a first inter-predicted picture of said multiple inter-predicted pictures is different from said dedicated pixel positions of said at least one group of intra-coded pixels in the remaining inter-predicted pictures of said multiple inter-predicted pictures; and a data processor configured to co-process pictures received by said receiver to form a media presentation in which said groups of intra-coded pixels are individually identifiable and a lost data packet being identifiable as a missed group of intra-coded pixels in said media presentation, wherein said digital media test sequence further comprises data packets with audio samples each initially being synchronized to a respective inter-predicted picture of said multiple inter-predicted pictures, a first set of said multiple audio samples includes non-background sound. data, and a second. remaining set of said multiple audio samples includes background sound data, said device further comprising;

an audio player configured to play back sound data of said audio samples in parallel with said co-processing allowing investigation of synchronization between video and audio based on a timing of playing back said non-background sound data.

13. The device according to claim 12, further comprising:

a loss counter for counting the number of missed groups of intra-coded pixels in said media presentation; and a parameter generator for generating a data connection quality parameter based on said counted number.

14. The method according to claim 1, 5, 10, or 12, wherein the at least one group of intra-coded pixels in each inter-predicted picture is distinguishable from the single-colored initial inter-predicted picture based on chrominance.

15. The method according to claim 1, 5, 10, or 12, wherein the at least one group of intra-coded pixels in each inter-predicted picture is distinguishable from the single-colored initial intra-predicted picture based on luminance.

* * * * *

UNITED STATES PATENT AND TRADEMARK OFFICE
CERTIFICATE OF CORRECTION

PATENT NO.      : 8,588,302 B2
APPLICATION NO. : 12/997750
DATED           : November 19, 2013
INVENTOR(S)     : Einarsson It is certified that error appears in the above-identified patent and that said Letters Patent is hereby corrected as shown below:

On the Title Page

Item (57), under "ABSTRACT", in Column 2, Line 10,
delete "(30, 332, 34, 36)" and insert -- (30, 32, 34, 36) --, therefor.

In the Drawings

In Fig. 5, Sheet 1 of 8, for Tag "S21", in Line 2, delete "DISCARABLE"
and insert -- DISCARDABLE --, therefor.

In the Specification

In Column 4, Line 32, delete "discusse" and insert -- discuss --, therefor.

In Column 18, Line 41, delete "Audovisual" and insert -- Audiovisual --, therefor.

In the Claims

In Column 19, Line 34, in Claim 5, delete "intial" and insert -- initial --, therefor.

In Column 20, Line 45, in Claim 10, delete "steps of;" and insert -- steps of: --, therefor.

In Column 20, Line 51, in Claim 11, delete "claims 10," and insert -- claim 10, --, therefor.

In Column 21, Line 19, in Claim 12, delete "sound. data, and a second. remaining" and
insert -- sound data, and a second remaining --, therefor.

Signed and Sealed this
Eighth Day of July, 2014

Michelle K. Lee
*Deputy Director of the United States Patent and Trademark Office*

CERTIFICATE OF CORRECTION (continued)
U.S. Pat. No. 8,588,302 B2

In Column 21, Line 21, in Claim 12, delete "comprising;" and insert -- comprising: --, therefor.

In Column 22, Line 4, in Claim 12, delete "on a timing of" and insert -- on a relative timing of --, therefor.

In Column 22, Line 13, in Claim 14, delete "claim" and insert -- claims --, therefor.

In Column 22, Line 16, in Claim 14, delete "inter-predicted" and insert -- intra-predicted --, therefor.

In Column 22, Line 17, in Claim 15, delete "claim" and insert -- claims --, therefor.